(12) United States Patent
Kodaypak et al.

(10) Patent No.: US 10,805,217 B2
(45) Date of Patent: Oct. 13, 2020

(54) CONTROL PLANE DEVICE SELECTION FOR BROADCAST SESSION EXCHANGE

(71) Applicant: AT&T INTELLECTUAL PROPERTY I, L.P., Atlanta, GA (US)

(72) Inventors: Rajendra Prasad Kodaypak, Sammamish, WA (US); Jiansong Wang, Parlin, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 171 days.

(21) Appl. No.: 14/937,865

(22) Filed: Nov. 10, 2015

(65) Prior Publication Data
US 2017/0135068 A1    May 11, 2017

(51) Int. Cl.
*H04L 12/803* (2013.01)
*H04W 4/06* (2009.01)

(52) U.S. Cl.
CPC ............ *H04L 47/125* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 8,472,377 B2 | 6/2013 | Becker et al. | |
| 8,849,270 B2 | 9/2014 | Taglienti et al. | |
| 2007/0223703 A1 | 9/2007 | Verma et al. | |
| 2008/0311949 A1 | 12/2008 | Koskinen et al. | |
| 2010/0232340 A1* | 9/2010 | Godor | H04H 20/57 370/312 |
| 2010/0322128 A1* | 12/2010 | Becker | H04W 8/186 370/312 |
| 2011/0098031 A1* | 4/2011 | Dakshayani | H04W 60/00 455/422.1 |
| 2011/0165855 A1* | 7/2011 | Hapsari | H04L 12/1895 455/404.1 |
| 2011/0235505 A1 | 9/2011 | Eswara et al. | |

(Continued)

FOREIGN PATENT DOCUMENTS

CN    101370163 B    7/2012

OTHER PUBLICATIONS

"4G Mobile Broadband Evolution: Release 10, Release 11 and Beyond—HSPA+, SAE/LTE and LTE-Advanced", 4gamericas.org, Oct. 2012, 234 pages.

*Primary Examiner* — Gregory B Sefcheck
*Assistant Examiner* — Suk Jin Kang
(74) *Attorney, Agent, or Firm* — Amin, Turocy & Watson, LLP

(57) ABSTRACT

Control plane devices are selected by a Multimedia Broadcast Multicast Service Gateway (MGW) based on session exchange procedural triggers received from a Broadcast Multicast Service Center (BMSC). In one aspect, the MGW can employ a serving area-based Domain Name System (DNS) query/response exchange for control plane device selection that simplifies the overall complex broadcast core network architecture and design. Additionally or optionally, the MGW can employ other factors, such as, but not limited to, round trip time (RTT), load information, active/inactive link status, etc. to select the control plane devices that are to be utilized for establishing the end-to-end control plane message exchanges.

20 Claims, 12 Drawing Sheets

(56) References Cited

U.S. PATENT DOCUMENTS

| | | | |
|---|---|---|---|
| 2011/0305183 A1* | 12/2011 | Hsu | H04W 72/005 370/312 |
| 2012/0106431 A1* | 5/2012 | Wu | H04W 4/00 370/312 |
| 2012/0263089 A1* | 10/2012 | Gupta | H04W 72/005 370/312 |
| 2013/0016645 A1 | 1/2013 | Moriwaki et al. | |
| 2013/0028118 A1 | 1/2013 | Cherian et al. | |
| 2013/0138814 A1* | 5/2013 | Kotecha | H04L 67/10 709/226 |
| 2013/0173769 A1* | 7/2013 | Seastrom | H04L 61/1511 709/223 |
| 2013/0235805 A1* | 9/2013 | Yang | H04W 76/10 370/328 |
| 2013/0250968 A1* | 9/2013 | Zhou | H04L 61/2007 370/431 |
| 2013/0273855 A1* | 10/2013 | Cherian | H04W 4/005 455/68 |
| 2014/0064099 A1* | 3/2014 | Kuroda | H04L 61/1511 370/236 |
| 2014/0355508 A1* | 12/2014 | Anchan | H04W 4/10 370/312 |
| 2014/0362756 A1* | 12/2014 | Maeda | H04L 5/0007 370/312 |
| 2015/0119023 A1* | 4/2015 | Wang | H04W 4/06 455/432.1 |
| 2015/0156658 A1 | 6/2015 | Zhang et al. | |
| 2015/0208209 A1* | 7/2015 | Jamadagni | H04W 4/06 370/312 |
| 2015/0230063 A1* | 8/2015 | Chandramouli | H04W 4/005 455/466 |
| 2016/0037421 A1* | 2/2016 | Jokinen | H04W 36/12 455/436 |
| 2016/0057681 A1* | 2/2016 | Wang | H04W 8/02 370/331 |
| 2016/0119830 A1* | 4/2016 | Iwai | H04W 76/10 370/331 |
| 2016/0227385 A1* | 8/2016 | Ahmad | H04L 65/4061 |
| 2016/0337310 A1* | 11/2016 | Faccin | H04L 61/2007 |
| 2017/0078828 A1* | 3/2017 | Watfa | H04W 4/005 |
| 2017/0118708 A1* | 4/2017 | Alon | H04W 52/0216 |
| 2017/0150416 A1* | 5/2017 | Malhotra | H04W 8/065 |
| 2017/0245187 A1* | 8/2017 | Iwai | H04W 36/12 |
| 2017/0289942 A1* | 10/2017 | Iwai | H04W 76/10 |
| 2017/0332257 A1* | 11/2017 | Fan | H04W 24/02 |
| 2017/0373950 A1* | 12/2017 | Szilagyi | H04L 47/2416 |
| 2018/0027414 A1* | 1/2018 | Li | H04W 12/06 455/435.1 |
| 2018/0227977 A1* | 8/2018 | Jin | H04W 76/15 |
| 2018/0242387 A1* | 8/2018 | El Khayat | H04W 76/40 |
| 2018/0332440 A1* | 11/2018 | Chandramouli | H04W 4/70 |

* cited by examiner

CONTROL PLANE DEVICE SELECTION FOR BROADCAST SESSION EXCHANGE

TECHNICAL FIELD

The subject disclosure relates to wireless communications, e.g., to control plane device selection for broadcast session exchange.

BACKGROUND

Long Term Evolution (LTE) broadcast, also referred to as evolved Multimedia Broadcast Multicast Service (eMBMS) technology will serve as one of the key building blocks for mobility network infrastructure evolution that can meet the demands of Fifth Generation (5G) network requirements. eMBMS provides an efficient means for delivering multimedia content to LTE users in a given broadcast serving area. Since scarce radio spectrum resources can be conserved by employing eMBMS, it presents itself as an alternative and cost effective multimedia data delivery mechanism.

Conventionally, eMBMS session exchange procedures are initiated by a Broadcast Multicast Service Center (BMSC) of the core mobility network. These session exchange procedures involve cumbersome logic for end-to-end control plane message exchanges between the BMSC and Evolved Node B (eNB). The complex mapping and/or manual provisioning of the BMSC with all its downstream control elements such as Multimedia Broadcast Multicast Service Gateway (MBMS GW/MGW), Mobility Management Entities (MMEs), and/or Serving GPRS Support Nodes (SGSNs) is extremely inefficient and operationally intensive, especially for large core networking domains deployed across distributed datacenters. Further, the message exchange issues between the network elements are amplified due to message length, node name identifiers, etc.

Besides the basic connectivity and provisioning limitations of conventional eMBMS network architecture, premium broadcast services introduction in targeted locations, dynamic user consumption, anticipating new service demands, and end-user quality of experience associated with a massive mobile connected user base may not be met with such a network design leading to poor customer satisfaction and subscriber churn in the industry. This can result in a ripple effect with revenue loss against multitude of mobile services.

DETAILED DESCRIPTION

Figure 1:
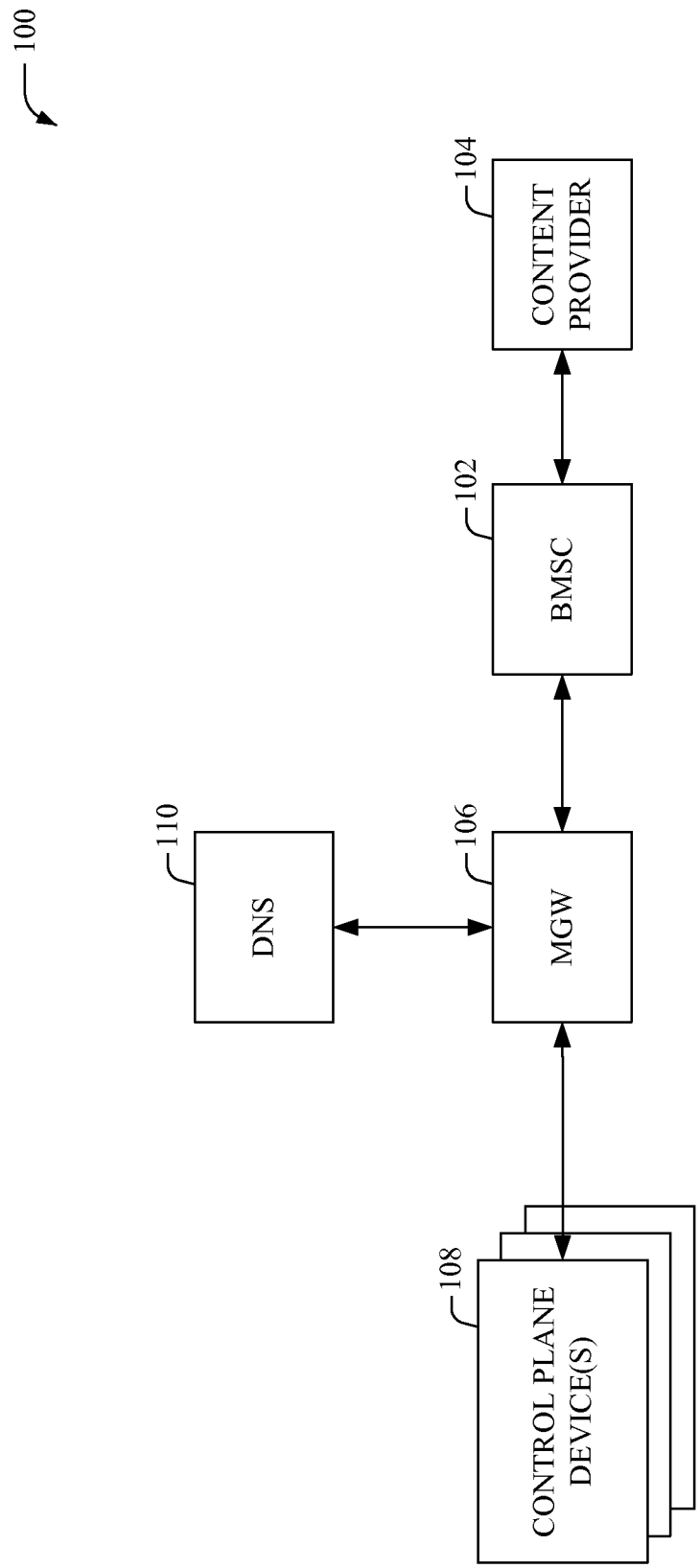
FIG. 1 illustrates an example system that facilitates dynamic control plane node selection during broadcast of content in a specified service area.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "center," "entity," "element," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

The systems and methods disclosed herein provide an intelligent method for Mobility Management Entity (MME) selection by a Multimedia Broadcast Multicast Service Gateway (MGW) based on session exchange procedural triggers received from a Broadcast Multicast Service Center (BMSC). In one aspect, a serving area-based Domain Name System (DNS) query/response exchange is utilized for dynamic MME selection that simplifies the overall complex broadcast core network architecture and design. As an example, by eliminating pre-provisioning of MME network elements and their complex node identifiers in the BMSC as well as in the MGW, the inefficiencies and/or operational overhead involved with a static MME selection process can be avoided.

Referring initially to FIG. 1, there illustrated is an example system 100 that facilitates dynamic control plane node selection during broadcast of content in a specified service area, according to one or more aspects of the disclosed subject matter. System 100 can be part of a cellular network and can comprise a Broadcast Multicast Service Center (BMSC) 102 that manages broadcast of multimedia content from a content provider(s) 104 to a group of user equipment (UE) within a defined service area by utilizing a point-to-multipoint broadcast technology, for example, an evolved Multimedia Broadcast Multicast Service (eMBMS). The content provider(s) 104 can include public land mobile network (PLMN)—internal providers and/or external content providers (e.g., coupled via an external packet data network, such as, the Internet). As an example, multimedia content can include streaming services, live (or near-live) mobile TV, on-demand video, radio broadcasting, file downloads, subscription notifications, advertisements/promotions, software updates, and/or emergency alerts.

According to an embodiment, the BMSC 102 can perform authentication, content authorization, billing and/or configuration of the data flow through the cellular network and can act as a proxy content server. Moreover, BMSC 102 can provide at least the following functions: (i) managing authorizations and generating charging records (Membership function); (ii) Scheduling of eMBMS sessions and transmissions (Session and Transmission function); (iii) Operating as a proxy agent for signaling between Gateway GPRS Support Nodes (GGSNs) and other BMSC sub-functions, transparent to the GGSNs; (iv) generating charging records for content provider charging of transmitted data (Proxy and Transport function); (v) providing service announcements for multicast and broadcast user services (Service Announcement function); and (vi) managing security functionality for MBMS (Security function).

The BMSC 102 can communicate with a Multimedia Broadcast Multicast Service Gateway (MBMS GW/MGW) 106 to establish a control plane and once established, transfer the content to the MGW 106 over the user-plane. Typically, the BMSC 102 can initiate eMBMS session procedures that involve cumbersome logic for end-to-end control plane message exchanges between the BMSC 102 and access points (not shown). Conventionally, to establish these eMBMS session procedures, a BMSC would be manually pre-provisioned with information (e.g., identification/addressing data) for all its downstream control devices (e.g., MGWs, Mobility Management Entities (MMEs), and/or Serving GPRS Support Nodes (SGSNs)). Mapping, tracking, and managing this information can be extremely complex, especially in large core networking domains across distributed datacenters and is not flexible or scalable. In contrast, the subject specification provides a BMSC 102 having a simplified design that simply initiates session exchange procedural triggers and a MGW 106 that intelligently and dynamically selects downstream control plane devices 108 based on an analysis of various parameters. As an example, the MGW 106 receives record data from a domain name server (DNS) 110 indicative of control plane devices 108 that are available within the desired service area. Additionally or optionally, the MGW 106 can employ other factors, such as, but not limited to, round trip time (RTT), load information, active/inactive link status, etc. to select the control plane devices 108 that are to be utilized for establishing the end-to-end control plane message exchanges.

Once the control plane has been established, the MGW 106 can route the multimedia content received from the BMSC 102 to all access points participating in the broadcast, for example, by employing IP multicast for downlink packet delivery. In one example, the access points can utilize single-frequency network (SFN) technology to broadcast the content into specified service areas, such that all contributing access points broadcast the same content during the same radio time slots. UEs can select subscribed broadcast streams within the SFN and receive relevant multimedia content. Although, the systems and methods disclosed herein are described with reference to a LTE network, it is noted that the subject specification is not so limited and can be implemented/utilized in various communication networks that perform multimedia content broadcast. Further, it is noted that the term "downstream" as used herein refers to a direction in which data sent from a network service provider device or content provider device to a user device. As an example, if a first device is further away (greater hops away) to the network service provider device or content provider device than a second device, then the first device is said to be downstream from the second device or conversely, the second device is upstream from the first device.

Figure 2:
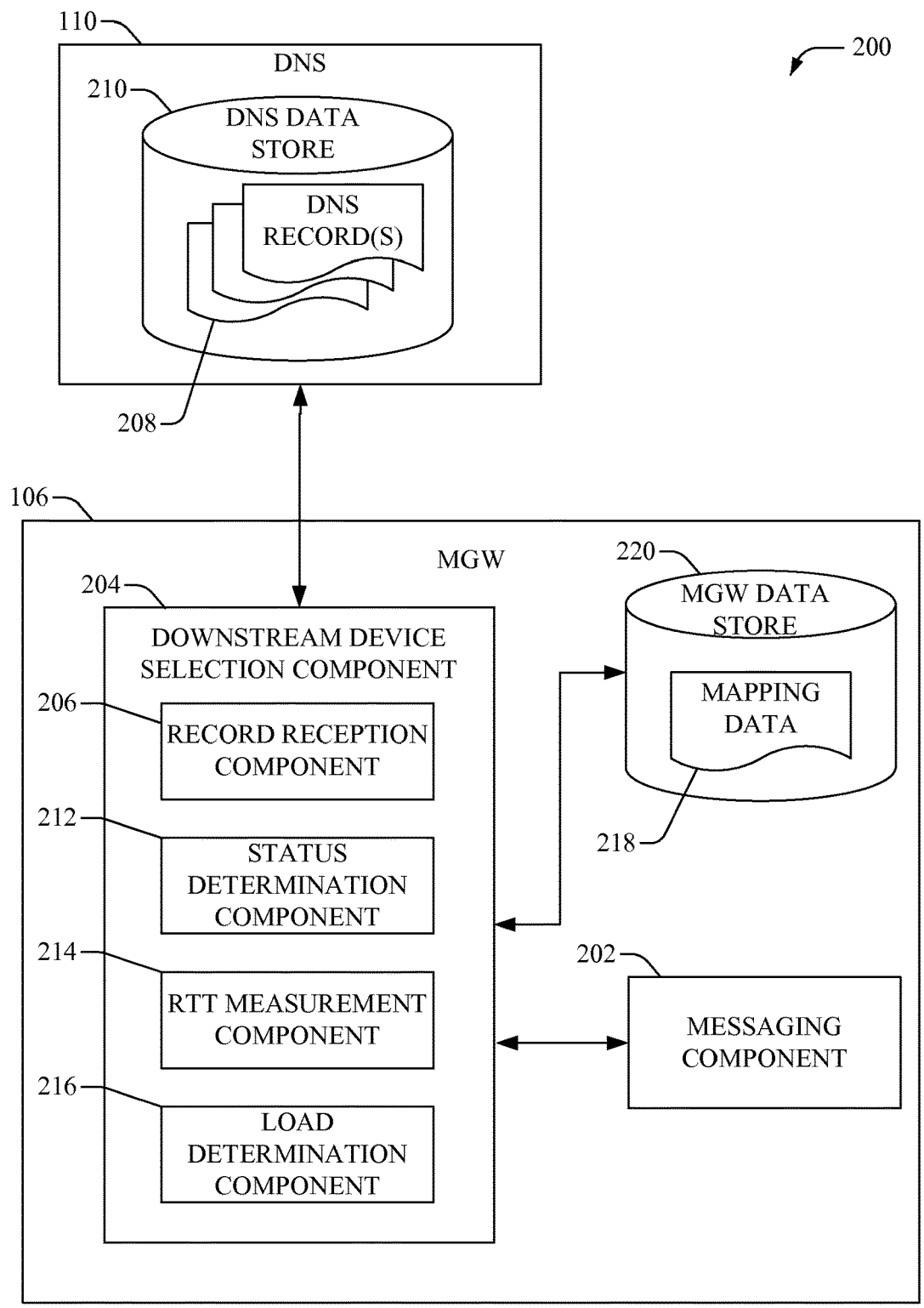
FIG. 2 illustrates an example system for dynamic downstream device selection during a multimedia content broadcast.

Referring now to FIG. 2, there illustrated is an example system 200 for dynamic downstream device selection during a multimedia content broadcast, in accordance with an aspect of the subject disclosure. In one aspect, the MGW 106 dynamically allocates and selects the downstream control plane entities (e.g., MMEs and SGSNs) for broadcast session related procedures such that the control plane is established before the user plane traffic can be transferred between the MGW 106 and appropriate access points that broadcast out the traffic to the user devices. It is noted that the MGW 106 and DNS 110 can include functionality as more fully described herein, for example, as described above with regard to system 100.

The MGW 106 includes a messaging component 202 that can receive session exchange procedural triggers, for example, a session start request from a BMSC (e.g., BMSC 102). The session exchange procedural trigger can include service area information associated with a target service area where the multimedia content is to be broadcasted. According to an aspect, a downstream device selection component 204 can be utilized to dynamically select a set of downstream control plane devices that are utilized to setup the control plane for the content delivery session. As an example, downstream device selection component 204 can include a record reception component 206 that retrieves DNS records 208 associated with the available downstream control plane devices. Moreover, the record reception component 206 can query the DNS 110 with the service area information and receive the DNS records 208 from the DNS 110. As an example, the DNS records 208 can include, but are not limited to, identifier data (e.g., node name such as Common Language Location Identifier (CLLI), group identifier (ID), code, etc.), address information (e.g., Internet Protocol (IP) addresses), availability data, of the downstream control plane devices. Further, the DNS 110 can provide a priority order and/or preference data associated with available downstream control plane devices that can be utilized by the downstream device selection component 204 to select a set of the available downstream control plane devices. In an aspect, the DNS 110 can determine (e.g., periodically or in response to an event) information indicative of coverage areas of access points that are served by downstream control plane devices, current availability of the downstream control plane devices, etc. This information can be stored within the DNS data store 210.

Additionally or optionally, the downstream device selection component 204 can select an optimal set of the available downstream control plane devices. In one aspect, a status determination component 212 can identify link status for the available downstream control plane devices. For example, link status data can be received from a GPRS tunneling protocol (GTP) management and control system (not shown) that employs periodic heartbeat messages to determine whether a control plane device is alive/active. It is noted that a device, indicated as available by the DNS record 208, may have inactive transport layer links and thus may not be alive/active. In another aspect, a RTT measurement component 214 can determine real-time RTT and/or latency associated with message delivery between the MGW 106 and each of the available downstream control plane devices. Moreover, a set of devices having a low RTT (e.g., less than a defined RTT threshold, within a defined RTT range, etc.) can be selected from the available downstream control plane devices. Further, in yet another aspect, a load determination component 216 can receive feedback information indicative of current loads of the respective available downstream control plane devices. Moreover, a set of devices having a low load (e.g., less than a defined load threshold, within a defined load range, etc.) can be selected from the available downstream control plane devices. Although, FIG. 2 depicts that the additional factors, such as, round trip time (RTT), load information, active/inactive link status, etc. are measured by the MGW 106, it can be appreciated that the additional factors can be determined by one or more network devices (not shown) coupled to the MGW 106 and/or received from the DNS 110.

According to an embodiment, mapping data 218 associated with the selected set of devices can be stored within a MGW data store 220. As an example, the selected devices and corresponding mapping data 218 can be updated periodically (or at a specified time) based on the interface link status (e.g., determined by the status determination component 212). Dynamic DNS-based selection along with the GTP interfaces path management procedures can assist the MGW 106 in making an intelligent decision on the primary/secondary options for serving control plane devices, prior to continuing with session procedures. Such a design can avoid pre-provisioning of the MGW 106 (and/or BMSC 102) with mapping information for all control plane devices and result in simplification of network core design that can further scale based on the network and service dynamics in a given location.

It is noted that the DNS data store 210 and the MGW data store 220 can include volatile memory(s) or nonvolatile memory(s), or can include both volatile and nonvolatile memory(s). Examples of suitable types of volatile and non-volatile memory are described below with reference to FIG. 9. The memory (e.g., data stores, databases) of the subject systems and methods is intended to comprise, without being limited to, these and any other suitable types of memory. Further, although depicted as residing completely within the MGW 106, it is noted that the MGW data store 220 can partially reside within the MGW 106 and/or be locally (or remotely) coupled to the MGW 106.

Figure 3:
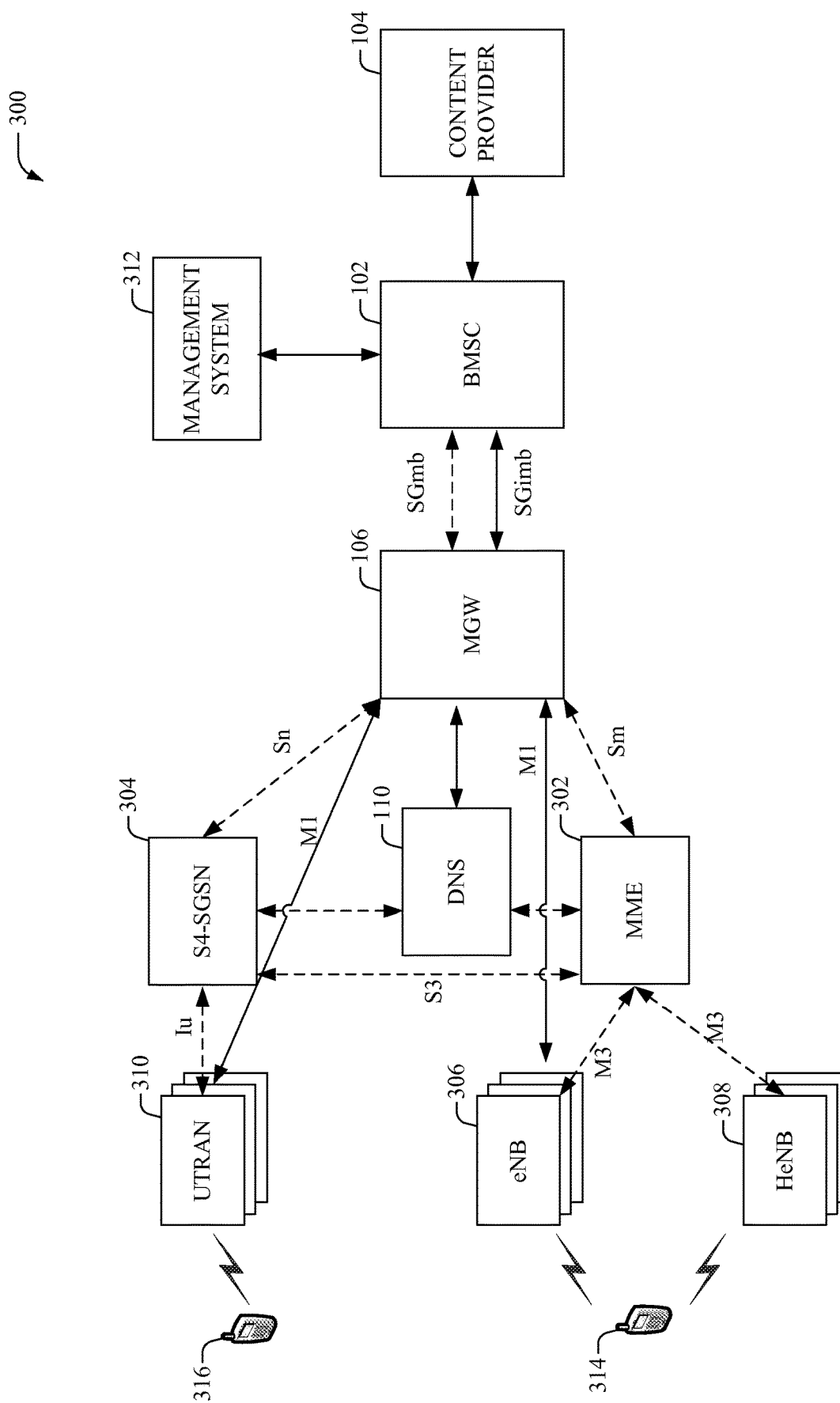
FIG. 3 illustrates an example Long Term Evolution (LTE)/Third Generation (3G) broadcast network architecture for efficiently establishing evolved Multimedia Broadcast Multicast Service (eMBMS).

Referring now to FIG. 3, there illustrated is LTE/3G broadcast network architecture 300 for efficiently establishing eMBMS, according to an aspect of the subject disclosure. In conventional network architectures, a list of control plane devices for the MGW is pre-defined in the BMSC along with their mapping to a set of MMEs and/or SGSNs and a given serving area or a set of serving areas. Accurate mapping of a complete list of downstream control nodes including MME/SGSN/MGWs was required in the BMSC and/or set of BMSCs based on the network topology design. For a centralized network topology, there could be a single BMSC geo-redundant pair deployed, that required the downstream control devices provisioning. For a distributed BMSC topology, the provisioning of control devices had to be replicated across each paired BMSC element. Further, in a multi-vendor MME and MGW regional pooled network design that is served by a single vendor geo-redundant BMSC pair, the BMSC had to be statically provisioned with each of the MME and MGW nodal information such as node name or CLLI and node identifiers. A paired mode MGW-BMSC design may be relatively less complex in terms of MME configuration than a distributed MGW-BMSC design; however, the details of each MME node across multi-vendors have to be configured in the MGW-BMSC. The architecture depicted in FIG. 3 averts such a complex pre-defined mapping and message exchange mechanism by segregating the MME and SGSN provisioning and selection methodology.

Referring back to FIG. 3, a simplified BMSC-MGW design is depicted wherein the control plane devices, such as, the MME 302 and the S4-SGSN 304 are dynamically selected by the MGW 106 based on a targeted broadcast coverage area. Typically, the MME 302 manages the signaling related to mobility and security (authentication and authorization) for eNodeBs (eNBs) 306 access. MME 302 can also manage tracking and paging procedures of the LTE UE 314 in idle-mode. Further, MME 302 operates as the termination point of a Non-Access Stratum (NAS) and manages NAS signaling and NAS signaling security. As an example, MME 302 can include functionality defined by 3GPP standards that are hereby incorporated by reference herein. The S4-SGSN 304 provides functions that facilitate connection to a serving gateway (SGW) and a Packet Data Network gateway (PDN GW). Moreover, the S4-SGSN 302 can include functionality defined by 3GPP standards that are hereby incorporated by reference herein. It is noted that the BMSC 102, the content provider 104, the MGW 106, and the DNS 110 can include functionality as more fully described herein, for example, as described above with regard to systems 100 and 200.

In one aspect, the BMSC 102 receives content from content provider 104 along with service area information that represents a geographical area or location where the content is to be broadcasted. In response, the BMSC 102 initiates a session exchange procedure to exchange end-to-end control plane messages. According to an aspect, radio access network elements, such as eNBs 306, Home eNBs (HeNBs) 308 (e.g., femtocell access points, pico stations, small cell access points, etc.), and/or NodeBs in the Universal Terrestrial Radio Access Network (UTRAN) 310 provide (e.g., during setup, installation, power-on, at a specified time, etc.) service area information representing the coverage area that they serve to serving control plane devices such as MME 302 and/or S4-SGSN 304. Mapping information that maps these access points with service area information is provided to a management system 312 (e.g., periodically, at a specified time, during idle mode, in response to an event, etc.), such as but not limited to an Operations support systems (OSS). The BMSC 102 can determine access points associated with the target service area associated with the received content by querying the management system 312.

The BMSC 102 provides a trigger (e.g., session start request transmitted via an SGmb diameter signaling interface) to the MGW 106, which in turn selects appropriate control plane devices, for example, MME 302 and/or S4-SGSN 304 using the GTPv2 control based Sm and/or Sn signaling interfaces to establish the control plane so that the broadcast content can be delivered to the appropriate user devices (e.g., LTE UE 314 and/or 3G UE 316) that are located within the target service areas (and have subscribed to content delivery). As an example, the user devices (e.g., LTE UE 314 and/or 3G UE 316) can include most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, LTE-based appliance, etc. Further, it is noted that the user devices can be mobile, have limited mobility and/or be stationary. Furthermore, it is noted that different signaling interfaces can be utilized for different communication networks and the subject specification is not limited to utilization of the aforementioned interfaces.

According to an aspect, the MGW 106 selects MME 302 and/or S4-SGSN 304 based on performing a DNS discovery process. Moreover, the MGW 106 retrieves, from the DNS 110, a list of all available control plane devices within the target service area. For example, the DNS 110 can provide a set of four MMEs and three SGSNs that serve access points within and/or mapped to the target service area. Accordingly, the MME 302 and/or S4-SGSN 304 can be dynamically selected instead of static provisioning of IP addresses of each of the control plane devices being pre-defined in MGW 106. The MGW 106 can further optimize the received set of control plane devices based on factors, such as, but not limited to, active link status, measured RTT time, utilization factors, load information, service area topology, service provider preferences, ranking/priority data, etc. In one example, the selected MME 302 and/or S4-SGSN 304 can then initiate exchange session related procedures with respective radio access network elements (e.g., eNB 306, HeNB 308, UTRAN 310) via M3 or Iu interfaces and establish end-to-end control plane communication. Once end-to-end control plane communication has been established, the eNB 306, HeNB 308, and/or UTRAN 310 can communicate with the MGW 106 to receive user plane data, for example, via a M1 interface and simultaneously (or substantially simultaneously) broadcast data to the respective user devices (e.g., LTE UE 314 and/or 3G UE 316). The MGW 106's dynamic selection of MME 302 and/or S4-SGSN 304 is a flexible, scalable, and reliable means of establishing optimal inter-connectivity between the broadcast core network elements that can result in faster control plane setup procedures.

Figure 4A:
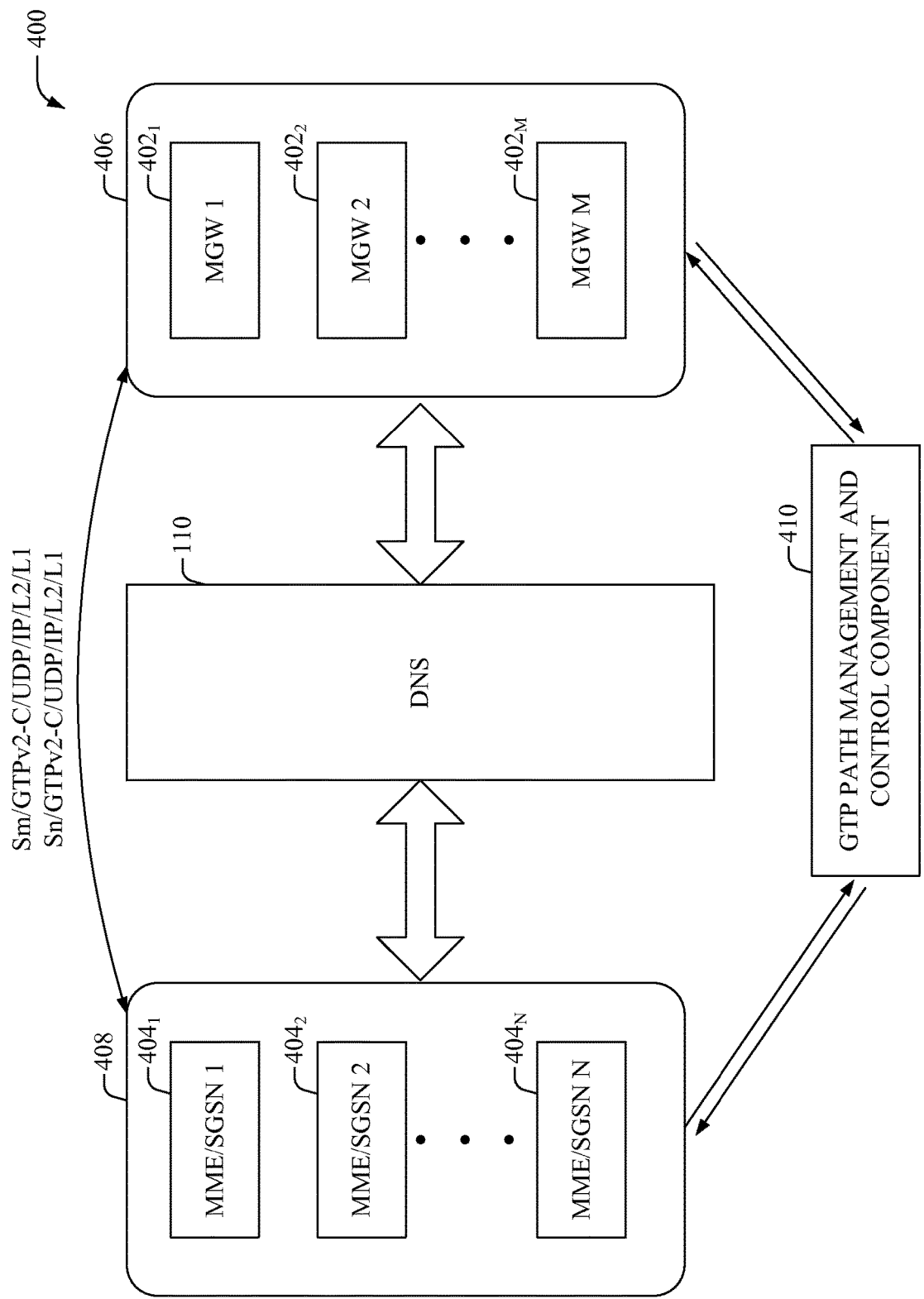
FIGS. 4A-4C illustrate example systems that depict different mappings of a Multimedia Broadcast Multicast Service Gateway (MGW) with its downstream control plane devices.
Figure 4B:
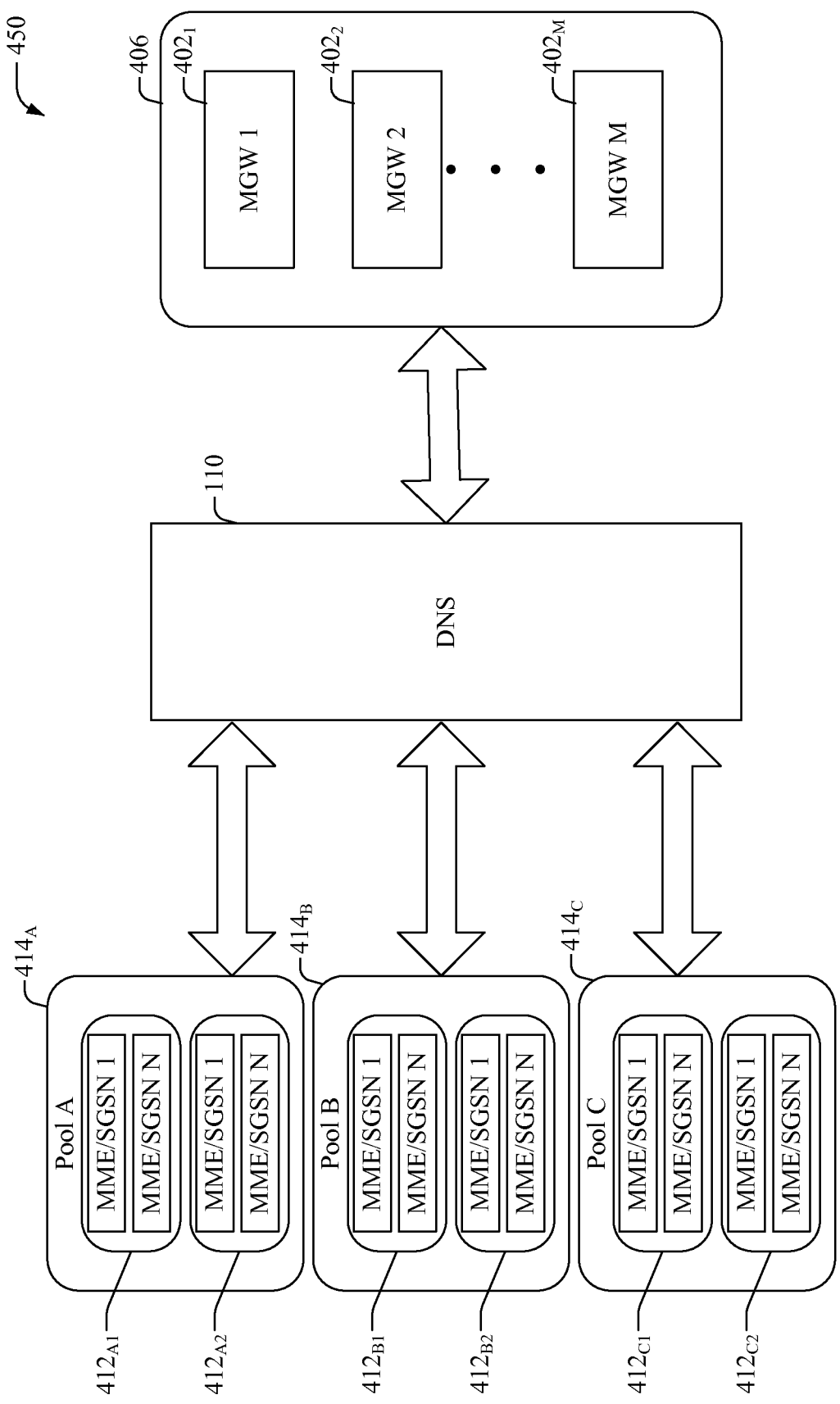
Figure 4C:
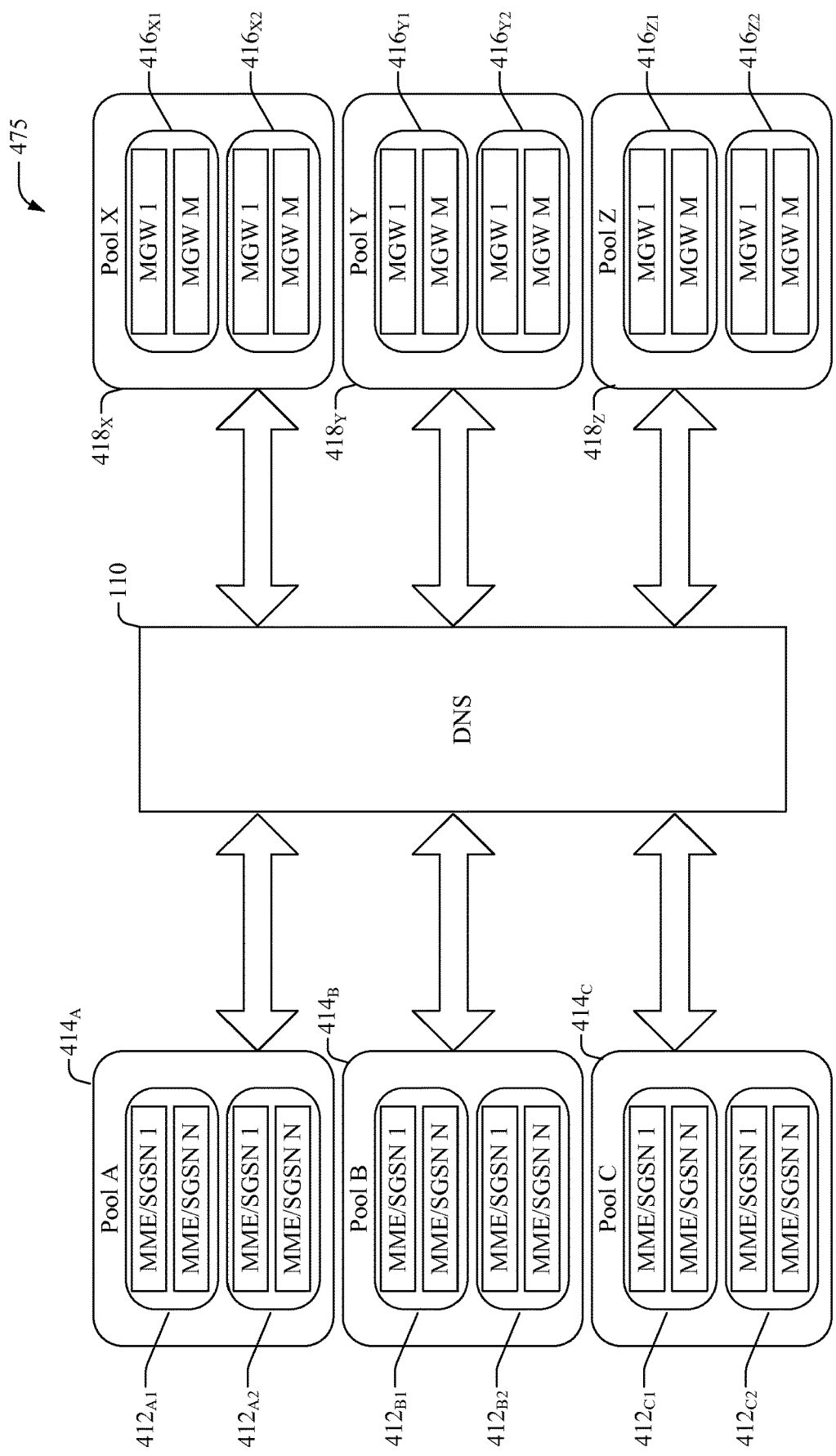

FIGS. 4A-4C illustrate example systems 400-475 that depict different mappings of the MGW with its downstream control plane devices, according to aspects of the disclosed subject matter. In a large mobile operator environment, the MME/SGSN and MGW nodes can be deployed in several different modes in addition to a 1:1 paired mode (illustrated in system 300). Typically, for commercial multimedia broadcast solution offerings in a large network, the 1:1 paired mode MME/SGSN and MGW (physical hardware platforms or virtualized software application functions) connectivity model does not suffice as it is fundamentally limited, does not provide the flexibility, scalability, and/or dynamic capacity requirements of an evolving mobility networking and services infrastructure that rely on the principles of network function virtualization (NFV) and software-defined networking (SDN).

In one example, system 400 illustrates MGWs ($402_1$-$402_M$; wherein M is most any natural number greater than 2) and MMEs/SGSNs ($404_1$-$404_N$; wherein N is most any natural number greater than 2) are deployed within geo-redundant datacenters within respective regional pools 406 and 408 (e.g., deployed within a defined region/area) that serve the entire communication network. Deploying geo-redundant datacenters provides backup in case one (or more) of the MGWs ($402_1$-$402_M$) or MMEs/SGSNs ($404_1$-$404_N$)

fails. In this example scenario, the DNS 110 resolves MME/SGSN devices and Sm/Sn interface IP addresses and provides this information to the MGWs ($402_1$-$402_M$) when requested. In one aspect, the GTP path management and control component 410 can provide the MGWs ($402_1$-$402_M$) additional information regarding MMEs/SGSNs ($404_1$-$404_N$), such as, but not limited to, link status, that is utilized to optimize control plane device selection.

In another example, system 450 illustrates MGWs ($402_1$-$402_M$) deployed within geo-redundant datacenters that are part of a single regional pool 406, whereas the MMEs/SGSNs that are deployed within geo-redundant datacenters ($412_{A1}$-$412_{A2}$, $412_{B1}$-$412_{B2}$, $412_{C1}$-$412_{C2}$) across multiple regional pools ($414_A$-$414_C$). The mapping information for MMEs/SGSNs of system 450 is more complex than that of system 400. Moreover, the DNS 110 resolves MME/SGSN devices and Sm/Sn interface IP addresses and provides this information to the MGWs ($402_1$-$402_M$) when requested.

In yet another example, system 475 illustrates both the MGWs and MMEs/SGSNs that are deployed within geo-redundant datacenters ($416_{X1}$-$416_{X2}$, $416_{Y1}$-$416_{Y2}$, $416_{Z1}$-$416_{Z2}$, and $412_{A1}$-$412_{A2}$, $412_{B1}$-$412_{B2}$, $412_{C1}$-$412_{C2}$, and respectively) across multiple regional pools ($418_X$-$418_Z$ and $414_A$-$414_C$ respectively). The mapping information for MMEs/SGSNs of system 470 is more complex than that of systems 400 and 450. Moreover, the DNS 110 resolves MME/SGSN devices and Sm/Sn interface IP addresses and provides this information to the MGWs ($416_{X1}$-$416_{X2}$, $416_{Y1}$-$416_{Y2}$, $416_{Z1}$-$416_{Z2}$) when requested.

Although only three regional pools are depicted, it can be appreciated that the subject disclosure is not limited to three pools and can be implemented with datacenters deployed within a greater or fewer number of regional pools. It can be noted that the DNS 110 can include functionality as more fully described herein, for example, as described above with regard to system 100-300. Further, the MGWs $402_1$-$402_M$ and $416_{X1}$-$416_{X2}$, $416_{Y1}$-$416_{Y2}$, $416_{Z1}$-$416_{Z2}$ can be substantially similar to MGW 106 and include functionality as more fully described herein, for example, as described above with regard to MGW 106. Additionally, MMEs/SGSNs $404_1$-$404_N$ and $412_{A1}$-$412_{A2}$, $412_{B1}$-$412_{B2}$, $412_{C1}$-$412_{C2}$ can be substantially similar to MME 302/S4-SGSN 304 and include functionality as more fully described herein, for example, as described above with regard to MME 302/S4-SGSN 304.

Figure 5:
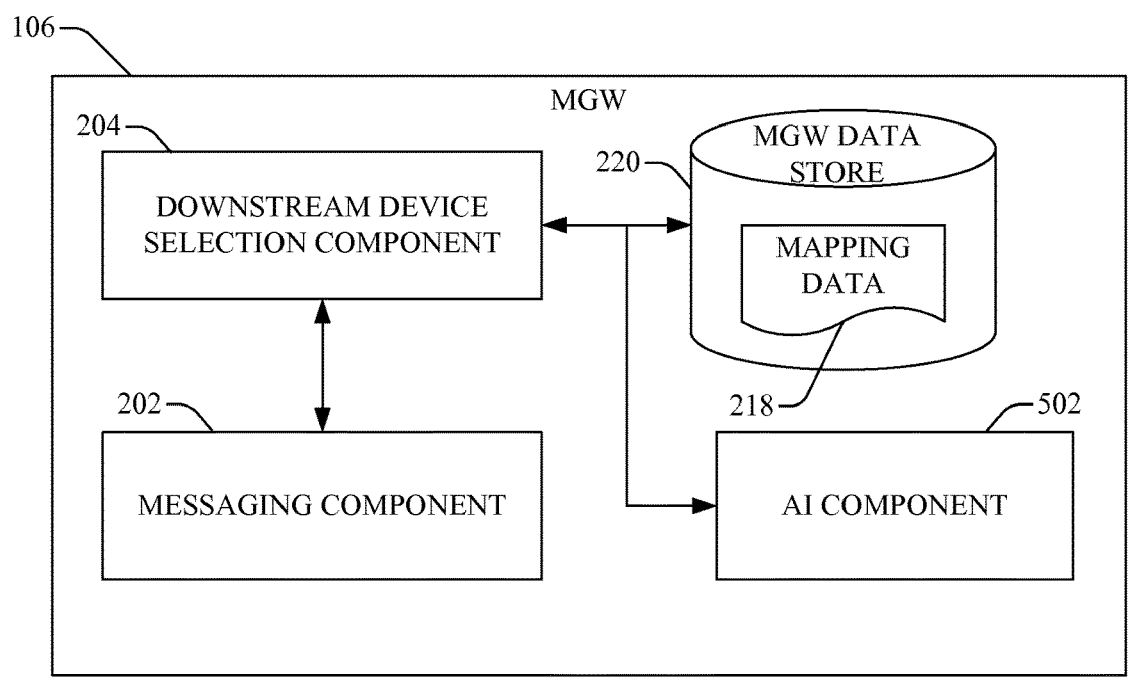
FIG. 5 illustrates an example system that facilitates automating one or more features in accordance with the subject embodiments.

Referring now to FIG. 5, there illustrated is an example system 500 that employs an artificial intelligence (AI) component (502) to facilitate automating one or more features in accordance with the subject embodiments. It can be noted that the MGW 106, messaging component 202, the downstream device selection component 204, mapping data 218, and MGW data store 220 can include functionality as more fully described herein, for example, as described above with regard to systems 100-300.

In an example embodiment, system 500 (e.g., in connection with automatically selecting downstream control plane devices) can employ various AI-based schemes (e.g., intelligent processing/analysis, machine learning, etc.) for carrying out various aspects thereof. For example, a process for determining which devices to select and/or optimal SGSNs or MMEs for a target service area or customized for specific type of content can be facilitated via an automatic classifier system implemented by AI component 502. Moreover, the AI component 502 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI component 502 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of content, etc.). For example, SVMs can be configured via a learning or training phase within a classifier constructor and feature selection module. Thus, the classifier(s) of AI component 502 can be used to automatically learn and perform a number of functions, including but not limited to determining according to a predetermined criteria, selection of SGSNs and/or MMEs for control plane establishment. The criteria can include, but is not limited to, historical patterns and/or trends, service provider preferences and/or policies, target service area, predicted load information, event data, latency data, reliability/availability data, current time/date, and the like.

According to an embodiment, the network architecture disclosed herein provides several advantages such as, but not limited to, (i) avoids complex provisioning of regionally pooled MMEs/SGSNs (e.g., $412_{A1}$-$412_{A2}$, $412_{B1}$-$412_{B2}$, $412_{C1}$-$412_{C2}$) in both the MGW 106 and the BMSC 102; (ii) eliminates MME dependency in BMSC 102 altogether and simplifies the design of the BMSC 102; (iii) facilitates MGW 106's dynamic selection of MME/SGSN nodes for broadcast session continuity; (iv) provides a faster selection of MMEs during Sm failover and rerouting for session management; (v) leverages GTP path management algorithms and customizes them between MGW 106 and MME/SGSN for optimization of Sm/Sn interface behavior; (vi) avoids costs associated with investing in a paired mode MME-MGW design; (vii) reduces operational overhead that would occur due to manually provisioning MME information in each of the MGW 106 and the BMSC 102; (viii) provides a distributed network topology design that benefits targeted premium broadcast as well as unicast services; (ix) provides a robust core network design that is scalable, reliable, and 5G ready; (x) provides an implementation common to LTE and 3G (SGSNs) network evolution for broadcast; (xi) utilizes an intelligent method of dynamic MME selection to optimize the MBMS control plane routing function in delivering cost-effective LTE broadcast video services; (xii) isolates the RAN from the core network elements (e.g., BMSC 102); etc.

Figure 6:
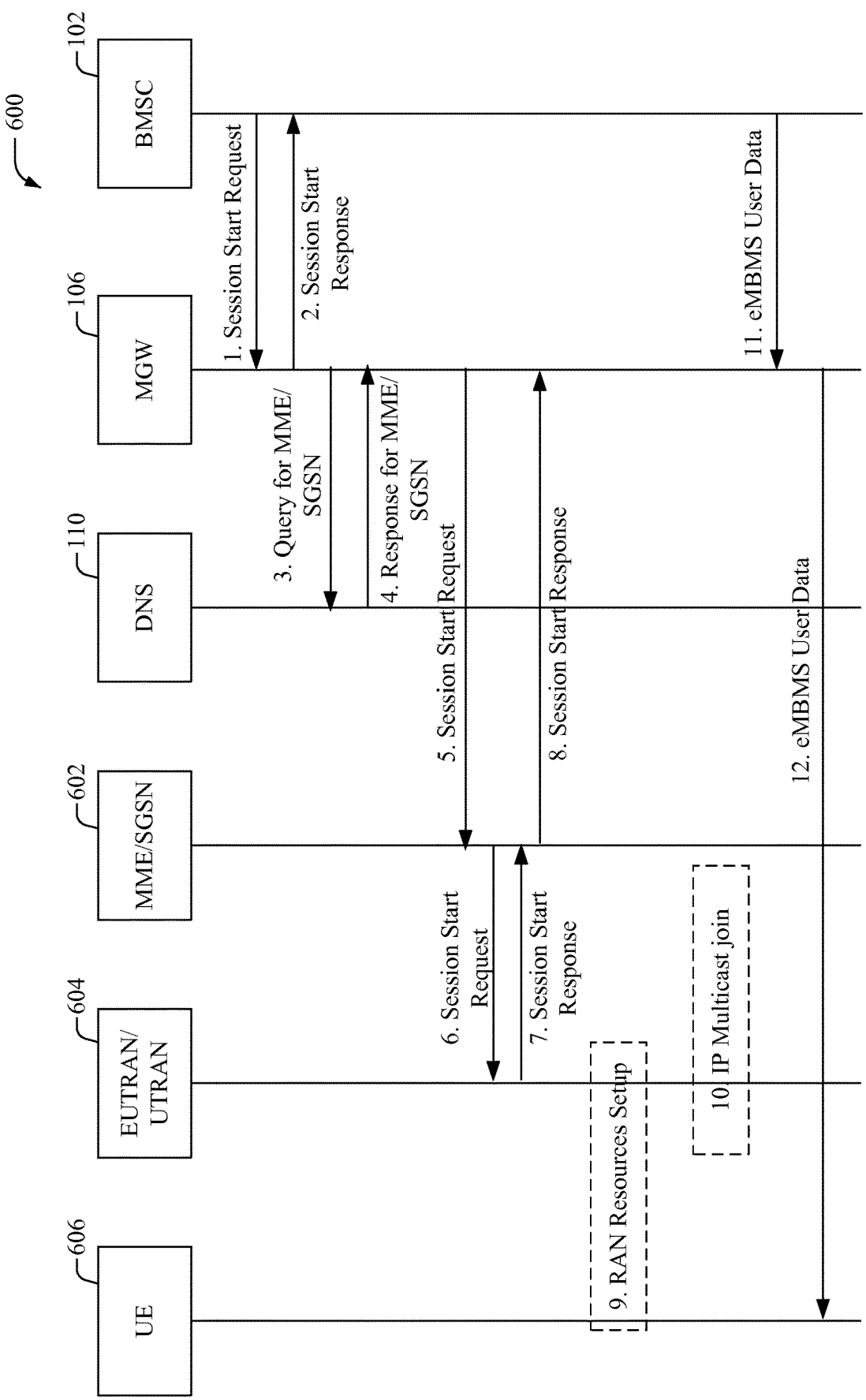
FIG. 6 illustrates an example flow diagram for eMBMS, according to an aspect of the subject disclosure.
Figure 7:
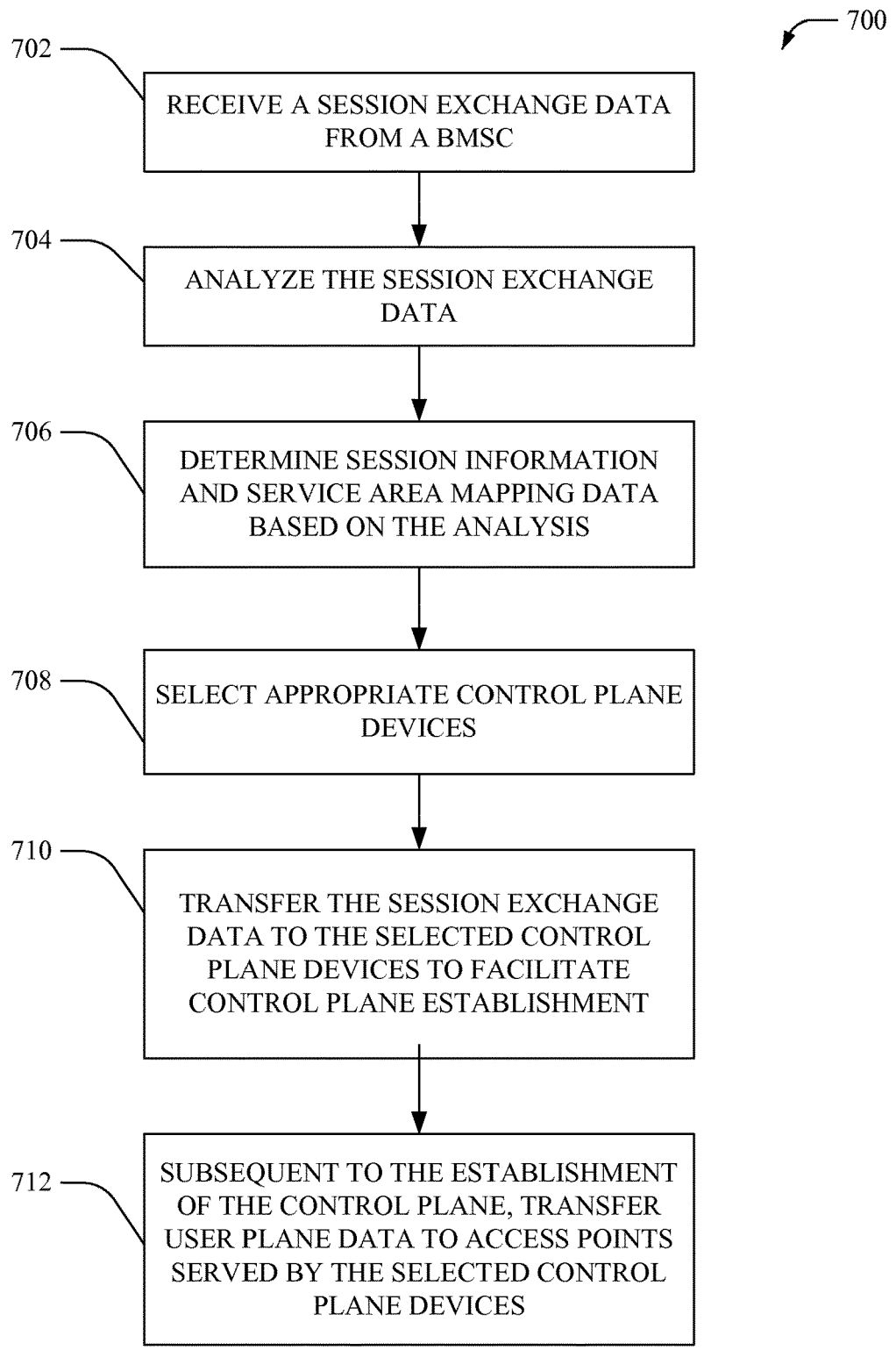
FIG. 7 illustrates an example method that facilitates efficient multimedia content broadcast.
Figure 8:
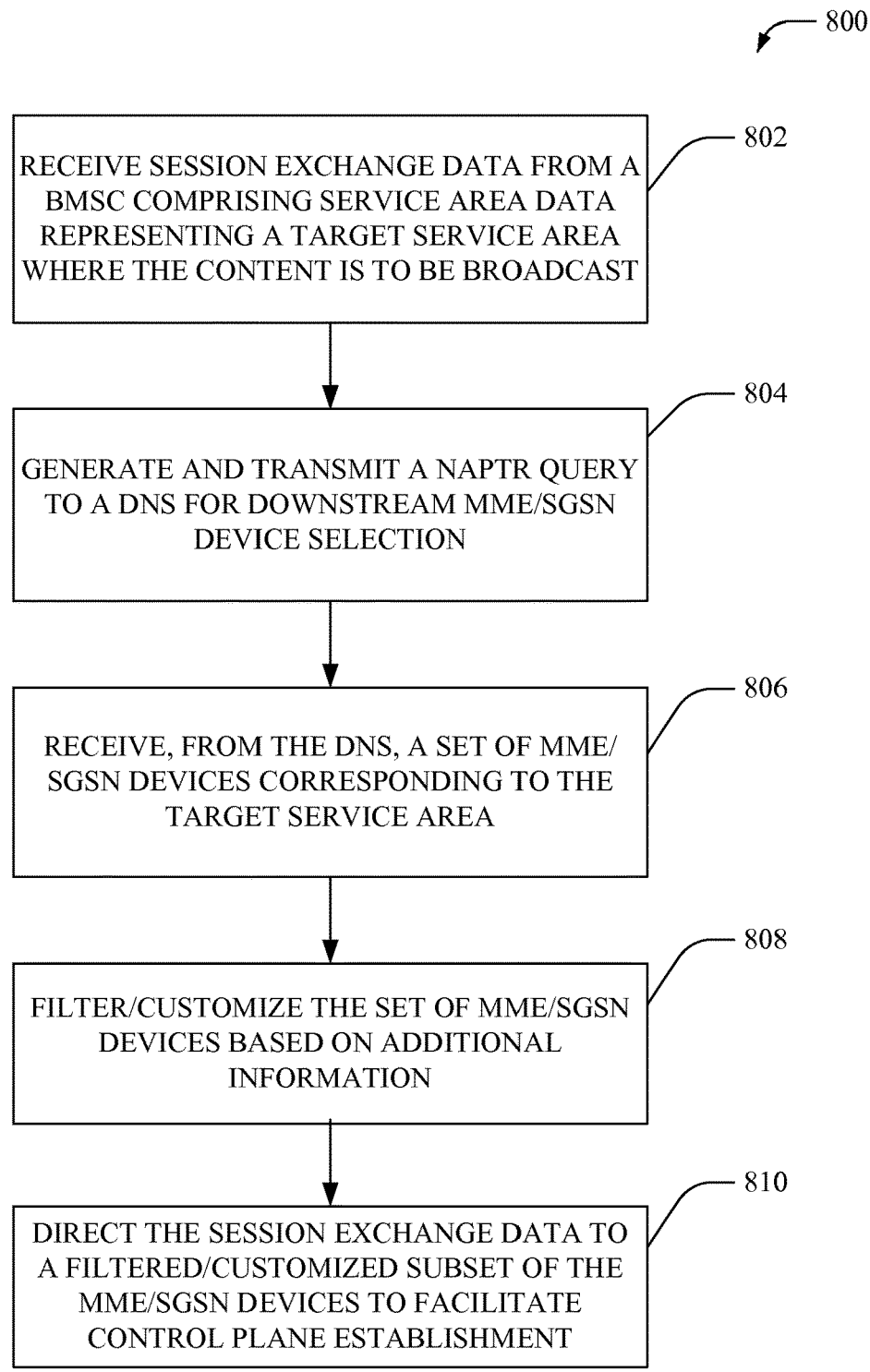
FIG. 8 illustrates an example method that facilitates efficiently selecting downstream control plane devices for eMBMS.

FIGS. 6-8 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 6, illustrated is an example flow diagram 600 for eMBMS, according to an aspect of the subject disclosure. The MGW 106 dynamically selects the MME/SGSN 602 and thus, provides a flexible, scalable, and reliable means for establishing optimal inter-connectivity between the broadcast core network elements that can result in faster control plane setup procedures. It can be noted that BMSC 102, MGW 106, and DNS 110 can include functionality as more fully described herein, for example, as described above with regard to systems 100-300.

In an aspect, subsequent to receiving multimedia content and data relating to a service area to which the content is to be broadcasted, at (1) the BMSC 102 employs a SGmb diameter based signaling interface for transferring a session start request to the MGW 106. At (2), the MGW 106 responds back to the BMSC 102 with a session start response. On receiving the response, the MGW 106 can create an eMBMS bearer context for the session and store the session attributes (e.g., a group identifier, such as but not limited to a Temporary Mobile Group Identifier (TGMI) indicative of a given service, a flow identifier, the serving areas, etc.). At 3, the MGW 106 sends a query (e.g., a Name Authority Pointer (NAPTR)-based query) to the DNS 110 for downstream MME/SGSN node selection. As an example, the query can include the session attributes. The DNS 110 can resolve MME/SGSN nodes and Sm/Sn interface IP addresses based on the NAPTR query using standard records. At 4, the DNS 110 can transmit a response (e.g., a NAPTR response) to the MGW 106 that can include a set of MME/SGSN devices, Sm/Sn interface IP addresses, and/or additional information, such as but not limited to active link status, node utilization factors, round trip latency of each node to the MGW 106, etc.

In one aspect, the MGW 106 can analyze the received information and select a subset of the MME/SGSN devices, for example, MME/SGSN 602. At 5, the MGW 106 can forward the session start request to the selected MME/SGSN 602, which in turn can transmit the request to served EUTRAN/UTRAN 604 at 6. At 7, the MME/SGSN 602 can receive a session start response from the EUTRAN/UTRAN 604 and at 8, forward the response to the MGW 106. Further, at 9, RAN resources can be setup and at 10, the EUTRAN/UTRAN 604 can join the IP multicast. Accordingly, an end-to-end control plane channel can be established. At 11, the eMBMS user data (e.g., multimedia content received from a content provider) is transferred from the BMSC 102 to the MGW 106 and at 12, the MGW 106 can deliver the eMBMS user data to a UE 606 (e.g., UE 314, UE 316) via the EUTRAN/UTRAN 604.

FIG. 7 illustrates an example method 700 that facilitates efficient multimedia content broadcast, according to an aspect of the subject disclosure. In an aspect, method 700 can be implemented by one or more network devices (e.g., MGW 106) of a communication network (e.g., cellular network). As an example, the multimedia content can include streaming services, live (or near-live) mobile TV, on-demand video/audio, radio broadcasting, file downloads, subscription notifications, advertisements/promotions, software updates, and/or emergency alerts.

At 702, session exchange data is received from a BMSC. As an example, the session exchange data can include a session start request and additional data, such as, but not limited to, target service area(s) where the content is to be broadcasted, access points mapped to the target service areas, etc. At 704, the session exchange data can be analyzed and at 706, service area mapping data can be determined based on the analysis. At 708, appropriate control plane devices (e.g., MMEs/SGSNs) can be selected. In one aspect, available control plane devices can be determined by a DNS query/response. In another aspect, various other factors, such as, but not limited to, RTT between the each of the available control plane devices and a MGW, current or future (e.g., predicted/estimated) load of the control plane devices, current active/inactive link status associated with the control plane devices, etc. can be utilized to select the control plane devices. At 710, the session exchange data is transferred to the selected control plane devices to facilitate end-to-end control plane establishment. Further, at 712, subsequent to the establishment of the control plane, user plane data (e.g., multimedia content) is transferred to access points served by the selected control plane devices. The access points can broadcast the multimedia content simultaneously (or substantially simultaneously) to all (or a set of) UEs within their respective coverage areas.

FIG. 8 illustrates an example method 800 that facilitates efficiently selecting downstream control plane devices for eMBMS, according to an aspect of the subject disclosure. As an example, method 800 can be implemented by one or more network devices (e.g., MGW 106) of a communication network (e.g., cellular network). At 802, session exchange data can be received from a BMSC. The session exchange data can comprise service area data representing a target service area where the content is to be broadcasted.

At 804, a NAPTR query can be generated and transmitted to a DNS for downstream MME/SGSN device selection. As an example, the query can include information such as, but not limited to, the target service area, access points serving the target service area, etc. At 806, a set of MME/SGSN nodes corresponding to the target service area can be received from the DNS. For example, the DNS can provide identifier data (e.g., node name such as CLLI, group ID, code, etc.), address information (e.g., IP addresses), and availability data, of the downstream MME/SGSN nodes. At 808, the set of MME/SGSN nodes can be filtered and/or customized based on additional information, such as, but not limited to RTT between the each of the set of MME/SGSN nodes and a MGW, load of the set of MME/SGSN nodes, current active/inactive link status associated with the set of MME/SGSN nodes, etc. As an example, the additional data can be determined by and received from a network device (e.g., DNS) and/or determined based on measurements and/or analysis (e.g., by the MGW). Further, at 810, the session exchange data can be directed to the filtered/customized subset of the set of MME/SGSN nodes to facilitate control plane establishment.

Figure 9:
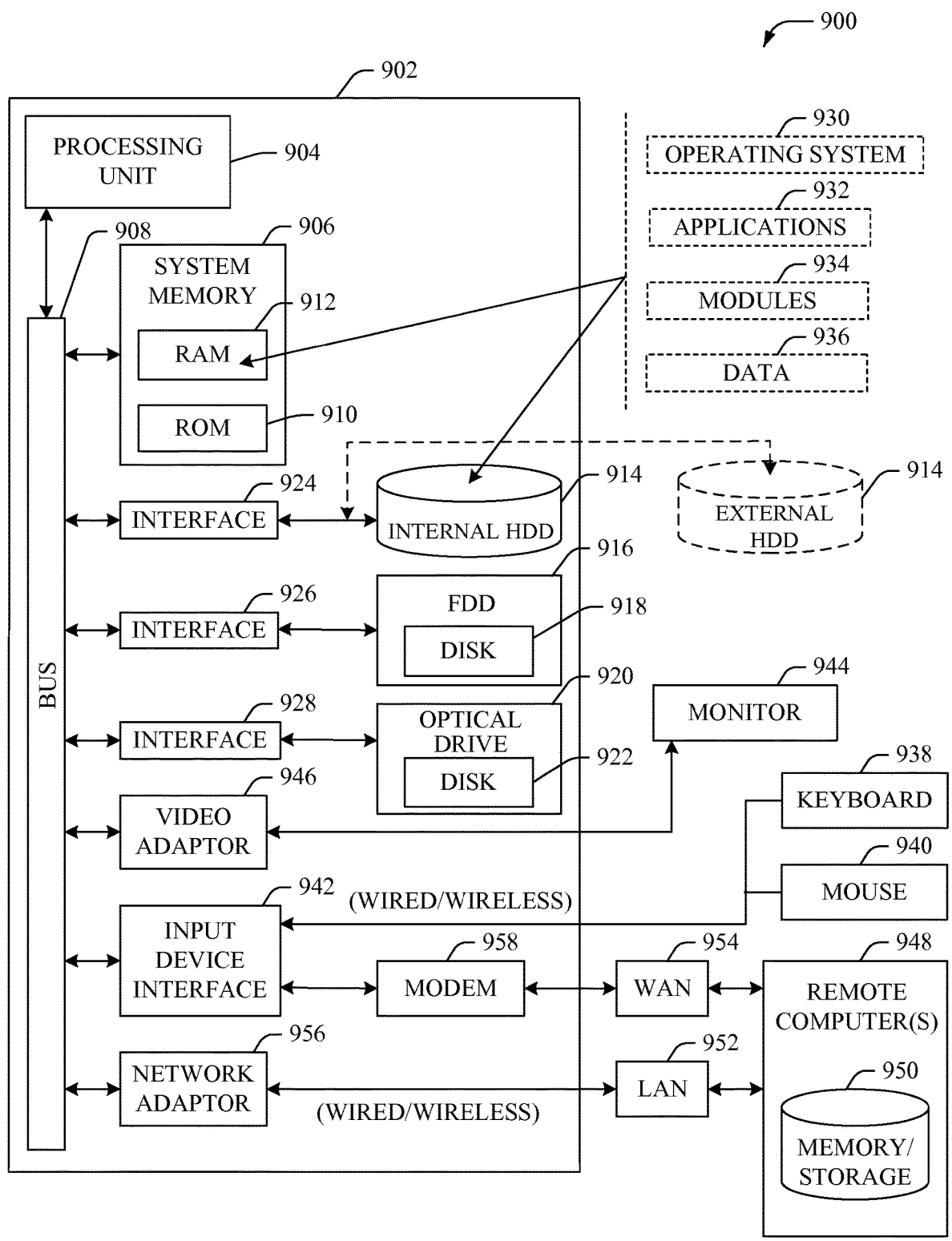
FIG. 9 illustrates a block diagram of a computer operable to execute the disclosed communication architecture.

Referring now to FIG. 9, there is illustrated a block diagram of a computer 902 operable to execute the disclosed communication architecture. In order to provide additional context for various aspects of the disclosed subject matter, FIG. 9 and the following discussion are intended to provide a brief, general description of a suitable computing environment 900 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various aspects of the specification includes a computer 902, the computer 902 including a processing unit 904, a system memory 906 and a system bus 908. As an example, the component(s), application(s) server (s), equipment, system(s), interface(s), gateway(s), controller(s), center(s), node(s) and/or device(s) (e.g., BMSC 102, content provider 104, MGW 106, control plane device(s) 108, DNS 110, messaging component 202, downstream device selection component 204, record reception component 206, DNS data store 210, status determination component 212, RTT measurement component 214, load determination component 216, MGW data store 220, MME 302, S4-SGSN 304, eNB 306, HeNB 308, UTRAN 310, management system 312, MGWs $402_1$-$402_M$, MMEs/SGSNs $404_1$-$404_N$, GTP path management and control component 410, datacenters $412_{A1}$-$412_{A2}$, $412_{B1}$-$412_{B2}$, $412_{C1}$-$412_{C2}$, datacenters ($416_{X1}$-$416_{X2}$, $416_{Y1}$-$416_{Y2}$, $416_{Z1}$-$416_{Z2}$, AI component 502, MME/SGSN 602, EUTRAN/UTRAN 604, and UE 606,) disclosed herein with respect to systems 100-600 can each include at least a portion of the computer 902. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914, which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the specification can be implemented with various commercially available operating systems or combinations of operating systems.

A user can enter commands and information into the computer 902 through one or more wired/wireless input devices, e.g., a keyboard 938 and/or a pointing device, such as a mouse 940 or a touchscreen or touchpad (not illustrated). These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc. A monitor 944 or other type of display device is also connected to the system bus 908 via an interface, such as a video adapter 946.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 is connected to the local network 952 through a wired and/or wireless communication network interface or adapter 956. The adapter 956 can facilitate wired or wireless communication to the LAN 952, which can also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are example and other means of establishing a communications link between the computers can be used.

The computer 902 is operable to communicate with any wireless devices or entities operatively disposed in wireless communication, e.g., desktop and/or portable computer, server, communications satellite, etc. This includes at least WiFi and Bluetooth™ wireless technologies or other communication technologies. Thus, the communication can be a predefined structure as with a conventional network or simply an ad hoc communication between at least two devices.

WiFi, or Wireless Fidelity networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
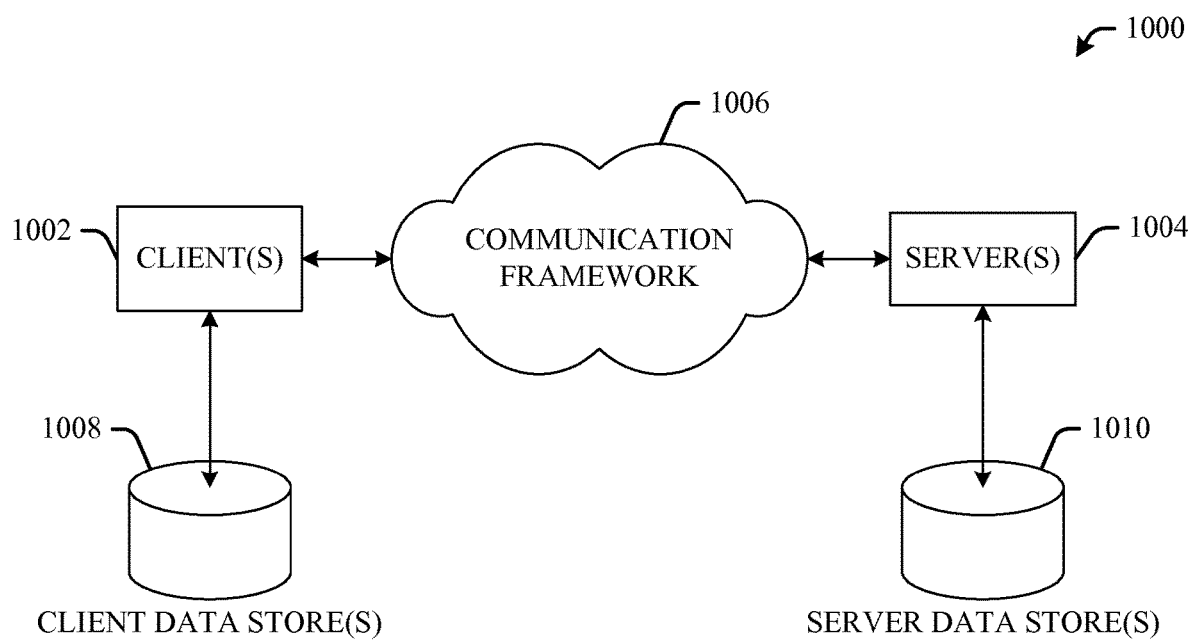
FIG. 10 illustrates a schematic block diagram of a computing environment in accordance with the subject specification

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet, cellular network, etc.) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multimedia broadcast multicast service gateway device, comprising:
   a processor; and
   a memory that stores executable instructions that, when executed by the processor, facilitate performance of operations, comprising:
      receiving request data to establish a control plane channel for a data session to broadcast multimedia content associated with a multimedia broadcast multicast service to a group of user equipment, wherein the request data comprises location data representing a target service area;
      subsequent to the receiving the request data, facilitating a transmission of query data from the multimedia broadcast multicast service gateway device to a domain name system device, wherein the query data comprises a request for record data indicative of available mobility management devices;
      as a result of the facilitating, receiving, from the domain name system device, the record data;
      determining latency data representing respective round trip times between the multimedia broadcast multicast service gateway device and the available mobility management devices; and
      based on the latency data, selecting, from the available mobility management devices, a mobility management device having a round trip time below a defined round trip time threshold, wherein the mobility management device is associated with an access point device that serves a portion of the target service area, and wherein the control plane channel is to be established via the mobility management device.

2. The multimedia broadcast multicast service gateway device of claim 1, wherein the receiving the request data comprises receiving the request data from a broadcast multicast service center device.

3. The multimedia broadcast multicast service gateway device of claim 1, wherein the request data comprises mapping data indicative of a mapping between an access point device and the target service area.

4. The multimedia broadcast multicast service gateway device of claim 1, wherein the record data has been updated in response to determining that an event has occurred.

5. The multimedia broadcast multicast service gateway device of claim 1, wherein the record data comprises address data indicative of an internet protocol address of the mobility management device.

6. The multimedia broadcast multicast service gateway device of claim 1, wherein the record data comprises identifier data indicative of an identifier of the mobility management device.

7. The multimedia broadcast multicast service gateway device of claim 1, wherein the selecting comprises selecting the mobility management device further based on priority data indicative of respective priorities associated with the available mobility management devices.

8. The multimedia broadcast multicast service gateway device of claim 1, wherein the selecting comprises selecting the mobility management device further based on a type of content of the multimedia content.

9. The multimedia broadcast multicast service gateway device of claim 1, wherein the selecting comprises selecting the mobility management device based on respective reliability data associated with the available mobility management devices.

10. The multimedia broadcast multicast service gateway device of claim 1, wherein the operations further comprise:
    directing, to the mobility management device, the request data to facilitate an establishment of the control plane channel.

11. The multimedia broadcast multicast service gateway device of claim 10, wherein the operations further comprise:
    subsequent to the establishment of the control plane channel, facilitating a transfer of user plane data to the access point device.

12. The multimedia broadcast multicast service gateway device of claim 11, wherein the user plane data comprises the multimedia content that is to be broadcasted by the access point device.

13. A method, comprising:
    receiving, by a multimedia broadcast multicast service gateway device comprising a processor, request data indicative of a session start request for broadcasting multimedia content to a group of user equipment in a target service area;
    subsequent to the receiving, facilitating, by the multimedia broadcast multicast service gateway device, a transmission of query data from the multimedia broadcast multicast service gateway device to a domain name system device, wherein the query data comprises a request for record data indicative of available mobility management devices;
    as a function of the facilitating, determining, by the multimedia broadcast multicast service gateway device, the record data;
    determining latency data representing respective round trip times between the multimedia broadcast multicast service gateway device and the available mobility management devices; and
    based on the latency data, determining, by the multimedia broadcast multicast service gateway device, a mobility management device having a round trip time below a defined round trip time threshold, of the available mobility management devices, to which the request data is to be transmitted, wherein the mobility management device is associated with an access point device that serves a portion of the target service area.

14. The method of claim 13, wherein the determining the mobility management device comprises determining the mobility management device based on common language location identifier data received from a domain name system device.

15. The method of claim 13, wherein the determining the mobility management device comprises determining the mobility management device based on preference data received from the domain name system device.

16. The method of claim 13, wherein the determining the mobility management device comprises determining the mobility management device based on status data indicative of a status of a transport layer link between the multimedia broadcast multicast service gateway device and the mobility management device.

17. The method of claim 13, further comprising:
facilitating, by the multimedia broadcast multicast service gateway device, a transmission of the request data to the mobility management device.

18. A non-transitory machine-readable storage medium, comprising executable instructions that, when executed by a processor of a multimedia broadcast multicast service gateway device, facilitate performance of operations, comprising:
in response to determining that trigger data indicative of a session exchange procedural trigger associated with broadcasting multimedia content associated with a multimedia broadcast multicast service to a group of user equipment has been received, querying a domain name system device for available mobility management devices that are associated with respective access point devices that serve a target service area;
based on a result of the querying, receiving, from the domain name system device, record data representing the available mobility management devices;
determining latency data representing respective round trip times between the multimedia broadcast multicast service gateway device and the available mobility management devices; and
based on the latency data, selecting a group of the available mobility management devices having respective round trip times below a defined round trip time threshold that are to be employed to facilitate an end-to-end control plane message exchange.

19. The non-transitory machine-readable storage medium of claim 18, wherein the selecting comprises selecting the group of the available mobility management devices based on priority data indicative of respective priorities associated with the available mobility management devices.

20. The non-transitory machine-readable storage medium of claim 18, wherein the selecting comprises selecting the group of the available mobility management devices based on load data representing loads of the respective available mobility management devices.

* * * * *